UNITED STATES PATENT OFFICE.

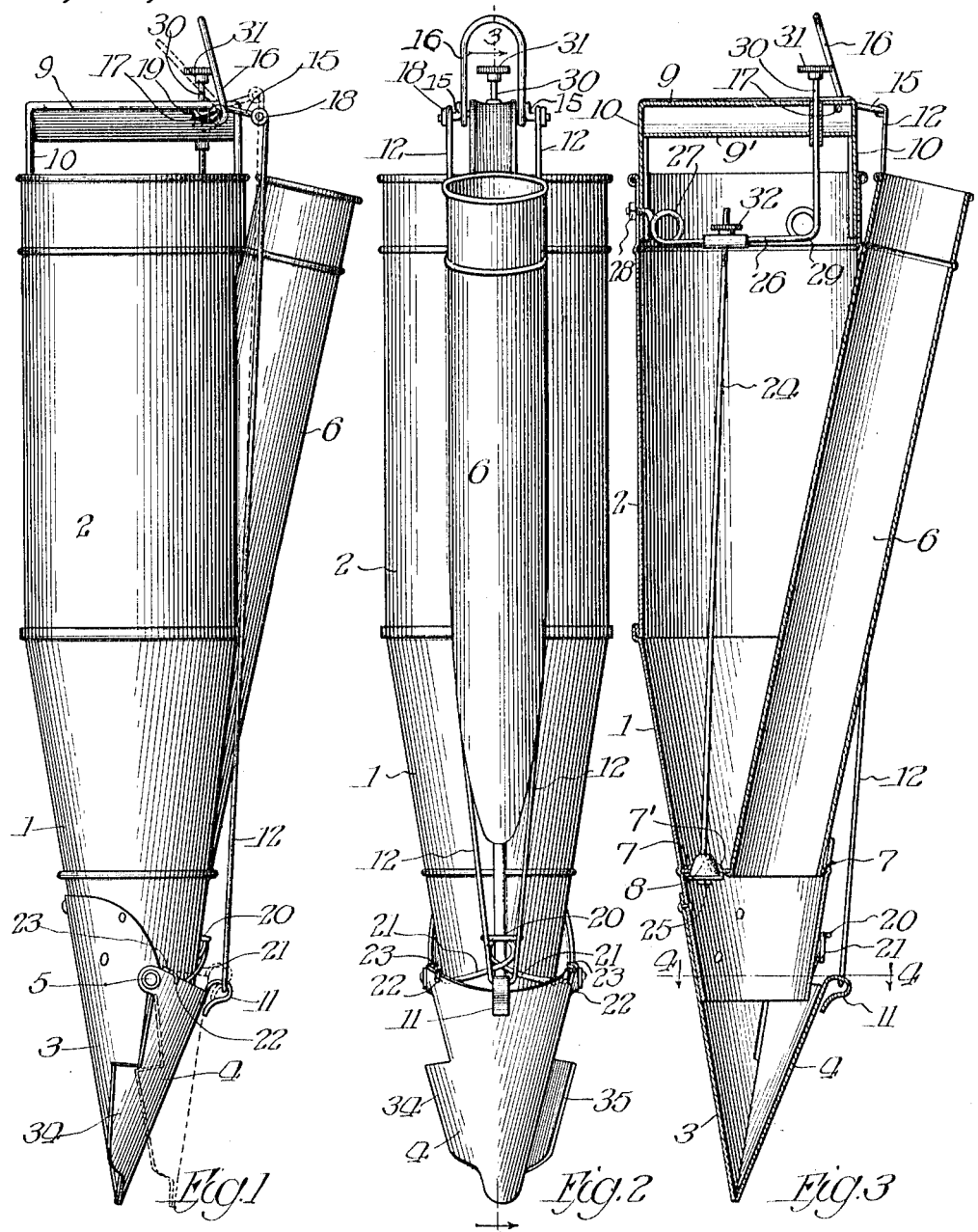

JOSEPH H. MASTERS, DECEASED, LATE OF CHICAGO, ILLINOIS, BY CLARISSA V. MASTERS, EXECUTRIX, OF CHICAGO, ILLINOIS.

PLANT-SETTER.

1,120,211.     Specification of Letters Patent.     Patented Dec. 8, 1914.

Application filed June 5, 1913. Serial No. 771,838.

*To all whom it may concern:*

Be it known that JOSEPH H. MASTERS, deceased, late a citizen of the United States, residing at Chicago, in the county of Cook and State of Illinois, did invent certain new and useful Improvements in Plant-Setters, of which the following is a description.

The invention relates to that general class of devices known as plant setters, or the like, and particularly to a device for setting and planting tobacco, cabbage, tomatoes, and similar plants, that are usually first grown in beds and later transplanted and set in the field for further development.

The invention has among its objects the production of a device of the kind described that is simple, convenient, efficient, durable and satisfactory, that may be used wherever found applicable.

The present invention is in the nature of an improvement over the device shown and described in U. S. Letters Patent No. 617,403, issued to the deceased on January 10, 1899.

To this end the invention consists in the novel construction, arrangement and combination of parts herein shown and described, and more particularly pointed out in the claims.

In the drawings, wherein like reference characters indicate like or corresponding parts, Figure 1 is a side elevation of the preferred form of device. Fig. 2 is also a side elevation of the same, turned to show another side. Fig. 3 is a sectional view taken substantially on line 3, 3 of Fig. 2, and Fig. 4 is substantially a cross sectional view taken on line 4, 4 of Fig. 3.

Referring to the drawings, 1 and 2 are casings connected to form a water reservoir adapted to accommodate a considerable quantity of water, and also to make the same of convenient height or length when carried, as hereafter described. Secured to the lower end of the part 1, is a shovel 3, and pivotally secured to the shovel 3 or to the part 1, or both, at 5, is a coöperating shovel 4. Extending to the interior of the part 1, and arranged to discharge between the shovels, is a plant tube 6, which is preferably open at the bottom at or below the partition 7, which forms the bottom for the water reservoir. At the bottom of the reservoir is a discharge opening or outlet, which is normally closed by a valve 8, controlled as hereafter described.

At the upper part of the reservoir is arranged a carrying handle 9, the ends of which are extended down at 10 for attachment to the casing 2. The handle part is also extended under as at 9' to form a convenient and comfortable grip for carrying the device. As previously mentioned, the shovel 4 is pivotally secured at 5 to the other shovel, or to the lower end of the casing 1, so that it may be opened. The shovel is provided with an extended part 11, to which the operating rod 12 may be attached. The rod shown is looped under the same and extended up upon each side of the plant tube 6, the ends being secured to levers 15, which are extended in the form of a bell crank, the ends of which are connected to form a loop 16. The bell crank 15—16 is pivotally secured at 17 to the handle 9, and the pivot or pin extends through the handle, the pin being extended as at 19 on one or both sides to form stops, and preferably soldered or otherwise secured to the part 15—16. The stops always maintain the levers in position for ready use.

The pivoted shovel 4 is normally maintained in the position shown in the drawings, or closed, by a resilient member 21, or equivalent means. As shown, the spring, or resilient member, consists of a looped part, which is engaged and maintained in position by a loop 20 on the reservoir part 1, the ends being extended and thence bent over the edge of the shovel, as at 22, so as to engage the same. The shovel part 4 may also be provided with stops 23, one on each side. When it is desired to open the shovels or separate them, the lever arm 16 is depressed, thereby raising the end 15, and consequently pulling on the loop 11, and moving the shovel 4 so that there is a space between the two, that is, opening it. As soon as the end or lever 16 is released, the spring 21 forces the shovel back to the closed position shown in the drawings.

Secured to the valve 8 is an operating rod 24, which rod may be secured to the valve by a nut 25, or its equivalent. As shown, the bottom of the reservoir is formed so as to provide a valve seat 7' for the valve. When it is desired to open the valve to permit water to pass down between the shovels, the valve rod 24 is depressed. To control and operate the valve rod, a resilient member 26 is provided, the same being preferably looped as at 27 and 29, so as to give resiliency, one end being secured at 28 to the casing 2, and the other end 30 being extended up through the handle and provided with a push button 31. The valve rod 24 is preferably adjustably secured to the part 26 by a nut 32, or equivalent means, so that it may be adjusted for wear or easily renewed.

When it is desired to open the valve, the button 31 is depressed, and when the same is released, the resiliency of the part 26 draws the valve closed. Where the valve and valve seat are constructed substantially as shown, the same does not become easily clogged or stopped up, particularly where fertilizer is mixed with the water in the reservoir. The valve itself may be made of rubber or any other suitable material. By flanging the bottom of the reservoir upwardly, as shown, the valve mechanism is very simple and the cost of manufacture is greatly reduced. The shovels may be and are preferably provided with the lips 34 and 35, for covering the roots, as hereafter described in the operation of the device.

Owing to the modified construction of the device, its operation is slightly different than the device illustrated in the patent mentioned. In setting the plant, the operator presses downwardly upon the handle 9, so as to force the shovels into the desired depths. When the land is nice and mellow, the weight of the setter when about two-thirds full of water, will make the hole plenty deep enough for ordinary plants. The button 31 is now depressed, letting the water pass down into the ground between the shovels. The plant is then dropped down to enter the planter jaws, and the operator then lifts the setter, at the same time pressing gently on the looped lever 16, which opens the jaws. The plant and water will be left in the ground at the bottom of the hole, and the operator can then kick the dirt on top of the water and roots, if necessary or desired, or can cover the plant roots by giving the setter a slight turn, when the lips 34 and 35 on the sides of the shovel will scoop in dirt enough to cover.

It is, of course, obvious that numerous immaterial changes may be made in the form, construction and combination of parts of the apparatus shown without departing from the spirit of the invention; hence it is not wished to limit the invention to the exact construction or arrangement of parts shown and described.

What I claim as new and desire to secure by Letters Patent is:—

1. In a plant setter, the combination of a casing provided with a bottom proximate the lower end thereof, said bottom upwardly flanged to form a valve seat on the lower face thereof, and with an opening therethrough at said seat, a carrying handle arranged at the upper end of the casing, a valve arranged below said bottom, a rod secured to said valve and extending through said opening to the upper part of the casing, a looped resilient member having one end secured to the casing near the top on the interior thereof, with the other end extended to the top side of the handle, and provided with a button at the end thereof, said rod adjustably secured to said looped member, a shovel rigidly secured to said casing below said bottom, a coöperating shovel pivotally secured to the casing below the bottom thereof, resilient means for normally holding said pivoted shovel in closed relation to the other shovel, means arranged at said handle adjacent to said button on said looped resilient member and connected to said pivoted shovel for controlling the operation thereof, means for limiting the movement of said shovel controlling means and an unobstructed plant tube extending through the wall of the casing and terminating below the bottom thereof, arranged to discharge between the shovels below the bottom of the casing.

2. The combination in a plant setter, of a reservoir and a plant tube arranged at one side of the reservoir and projecting therein, a pair of shovels carried by the reservoir at the lower end thereof, one of said shovels being movable relative the other, said reservoir provided with a carrying handle at the upper end thereof, a resilient valve-controlling member secured to the reservoir and extending through the handle to the upper face thereof, a rod adjustably secured to said resilient member and extended through the bottom of the reservoir, a valve member secured to the lower end of said rod, a bell-crank member secured to said handle proximate said resilient valve-controlling member, means secured to said bell-crank member and coöperating with said handle for limiting the movement of the bell-crank, and means for connecting said bell-crank with said movable shovel, comprising a looped flexible member extending from the bell-crank on each side of the plant tube and connected to the shovel.

3. In a device of the kind described and in combination, a fluid reservoir having a discharge opening in the lower end thereof, a pair of shovels secured to said reservoir, one of said shovels movable relative the other, means for normally maintaining said shovel in closed position, means for positively opening the shovel as desired, a valve member for said discharge opening, an operating rod extending from said valve member to proximate the top of the reservoir, means arranged at the top of the reservoir for controlling said valve rod, a plant tube secured to said reservoir and extending thereinto with its discharge opening below the lower end of said reservoir.

In testimony whereof, I have hereunto signed my name in the presence of two subscribing witnesses.

CLARISSA V. MASTERS,
*Executrix of the estate of Joseph H. Masters, deceased.*

Witnesses:
EDWIN L. MASTERS,
B. A. VEALE.

Copies of this patent may be obtained for five cents each, by addressing the "Commissioner of Patents, Washington, D. C."